(12) United States Patent
Barrios et al.

(10) Patent No.: US 9,475,352 B2
(45) Date of Patent: Oct. 25, 2016

(54) HIGH VOLUME AIR VALVE FOR A TIRE BEAD TOOL

(75) Inventors: Jose Barrios, Owatonna, MN (US); Robert Kochie, Dodge Center, MN (US)

(73) Assignee: BOSCH AUTOMOTIVE SERVICE SOLUTIONS INC., Warren, MI (US)

(*) Notice: Subject to any disclaimer, the term of this patent is extended or adjusted under 35 U.S.C. 154(b) by 611 days.

(21) Appl. No.: 13/588,839

(22) Filed: Aug. 17, 2012

(65) Prior Publication Data

US 2014/0048215 A1 Feb. 20, 2014

(51) Int. Cl.
F16K 1/34 (2006.01)
F16K 31/60 (2006.01)
B60C 25/14 (2006.01)

(52) U.S. Cl.
CPC .............. *B60C 25/145* (2013.04); *F16K 1/34* (2013.01); *F16K 31/602* (2013.01)

(58) Field of Classification Search
CPC ...... F16K 1/34; F16K 31/602; B60C 25/145
USPC .......................... 157/1, 1.1, 1.17, 1.33, 1.43; 261/231–246
See application file for complete search history.

(56) References Cited

U.S. PATENT DOCUMENTS

| 290,446 | A |   | 12/1883 | McConnell |
|---|---|---|---|---|
| 3,012,592 | A | * | 12/1961 | Wright ..................... B67D 7/48 137/628 |
| 3,276,486 | A | * | 10/1966 | Slattery ..................... B67D 7/48 137/488 |
| 3,683,991 | A |   | 8/1972 | Ruhland et al. |
| 3,814,163 | A |   | 6/1974 | Charles et al. |
| 3,866,654 | A | * | 2/1975 | Duquesne ..................... 157/1.1 |
| 4,784,412 | A |   | 11/1988 | Van Dongen |
| 5,417,259 | A | * | 5/1995 | Schneider .............. B67D 7/048 141/206 |
| 5,570,733 | A |   | 11/1996 | Desparois et al. |

(Continued)

FOREIGN PATENT DOCUMENTS

DE 3236913 A1 4/1984
EP 0290259 A2 11/1988

OTHER PUBLICATIONS

International Search Report and Written Opinion in corresponding Application No. PCT/US2013/055423, dated Jan. 29, 2014 (10 pages).

(Continued)

*Primary Examiner* — Craig Schneider
*Assistant Examiner* — Frederick D Soski
(74) *Attorney, Agent, or Firm* — Baker & Hostetler LLP

(57) ABSTRACT

A valve assembly includes a body structure having a proximal inlet tube and a distal outlet tube separated by a valve cylinder portion, a flow control valve situated in the valve cylinder portion, the flow control valve including a valve plug and an actuator shaft, and an actuation control pivotally mounted to the body structure, wherein rotational movement of the actuation control exerts an axial force against the actuator shaft to move the valve plug through the valve cylinder portion and open fluid communication between the proximal inlet tube and the distal outlet tube. A bead seating system includes means for establishing fluid communication between a container of pressurized fluid and a valve assembly, means for transferring rotational movement of a actuation control pivotally mounted on the valve assembly into an axial force, means for establishing fluid communication between the container and a bead seating tool via the valve assembly.

14 Claims, 5 Drawing Sheets

(56) References Cited

U.S. PATENT DOCUMENTS

| | | | |
|---|---|---|---|
| 5,878,801 A | 3/1999 | Ellis | |
| 5,884,659 A * | 3/1999 | Prosser et al. | 137/587 |
| 6,585,014 B1 * | 7/2003 | Fink, Jr. | B67D 7/48 141/206 |
| 7,082,972 B1 * | 8/2006 | Healy | B67D 7/54 141/192 |
| 2003/0167833 A1 | 9/2003 | Corghi | |
| 2011/0247760 A1 | 10/2011 | White | |

OTHER PUBLICATIONS

United States Office Action dated Mar. 23, 2015, in U.S. Appl. No. 13/750,633.

* cited by examiner

HIGH VOLUME AIR VALVE FOR A TIRE BEAD TOOL

FIELD OF THE DISCLOSURE

The disclosure generally relates to tire bead seating tools, and, more particularly, to methods and systems for seating a tire bead onto a bead area of a wheel or rim using a high volume air valve.

BACKGROUND OF THE DISCLOSURE

A tire bead is an important structural component of many tires. The tire bead is typically the inner most edge of the inner and outer sidewalls of a tire. When the tire is mounted on a wheel (or rim), these portions of the tire are in direct contact with the wheel (or rim). Particularly in tubeless tires, for example, the tire bead couples with the wheel structure to form an air-tight seal so that an interior pressure chamber may be maintained between the tire and the wheel. The tire may thus be inflated with air, nitrogen, or any other suitable gas, typically via a conventional valve stem. The interior pressure chamber is maintained at a desired pressure, which, in turn, exerts an outwardly directed force against the tire bead to assist in maintaining the air-tight seal.

Due to the strength and rigidity imparted to the sidewalls of many of today's tires, particularly larger automobile and/or truck tires, for example, it is often difficult to mount a tire onto the wheel so that the tire bead properly seats onto or against a bead area to form the air-tight seal. Accordingly, mounting a tire often involves a secondary step of specifically seating the tire bead. One conventional method for seating the tire bead involves using a special pneumatic seating tool that injects high pressure air into a gap between the loose tire and the wheel structure. The sudden influx of pressurized air into the internal pressure chamber forces the sidewalls to quickly expand and/or snap the tire bead into position onto or against the bead area of the tire structure, thus creating the air-tight seal. The internal pressure chamber may then be inflated with air to the desired pressure.

Conventional pneumatic seating tools may rely on a ball valve to discharge pressurized air from a pressurized air tank, for example. However, the motion required to quickly open and/or close these valves often causes the nozzle to lift off of the wheel, resulting in a significant loss of control over the bead seating process. Other conventional pneumatic seating tools automatically discharge a predetermined volume of air in a single blast, regardless of the tire size to seat. Thus, pressurized air is often wasted when these tools are used to seat normal or smaller sized tires, the larger than required volumes of air draining the tank much more quickly than would otherwise be necessary.

It may be disclosed to provide a high volume air valve for a tire bead tool that provides a quick and accurate airflow discharge in easily controlled bursts.

SUMMARY OF THE DISCLOSURE

The foregoing needs are met by the present disclosure, wherein according to certain aspects, a valve assembly includes a body structure having a proximal inlet tube and a distal outlet tube separated by a valve cylinder portion, a flow control valve situated in the valve cylinder portion, the flow control valve including a valve plug and an actuator shaft, and an actuation control pivotally mounted to the body structure, wherein rotational movement of the actuation control exerts an axial force against the actuator shaft to move the valve plug through the valve cylinder portion and open fluid communication between the proximal inlet tube and the distal outlet tube.

In accordance with another aspect of the present disclosure, a bead seating system includes a container for storage of a pressurized fluid, a valve assembly in fluid communication with the container, the valve assembly having a body structure including a proximal inlet tube and a distal outlet tube separated by a valve cylinder portion, a flow control valve situated in the valve cylinder portion, the flow control valve including a valve plug and an actuator shaft, and an actuation control pivotally mounted to the body structure, wherein rotational movement of the actuation control exerts an axial force against the actuator shaft to move the valve plug through the valve cylinder portion and open fluid communication between the proximal inlet tube and the distal outlet tube, and a bead seating tool in fluid communication with the distal outlet tube for receiving the pressurized fluid when fluid communication is established between the proximal inlet tube and the distal outlet tube.

In accordance with yet other aspects of the present disclosure, a method of seating a tire bead on a rim includes providing a bead seating system in accordance with the present disclosure, mounting the bead seating tool onto the rim so that pressurized fluid may be discharged into a gap between the tire bead and the rim, and establishing fluid communication between the storage container and the bead seating tool by applying pressure to the actuation control and opening the flow control valve to discharge the pressurized fluid.

There has thus been outlined, rather broadly, certain aspects of the present disclosure in order that the detailed description herein may be better understood, and in order that the present contribution to the art may be better appreciated.

In this respect, before explaining at least one embodiment of the invention in detail, it is to be understood that the invention is not limited in its application to the details of the construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE DISCLOSURE

Figure 1:
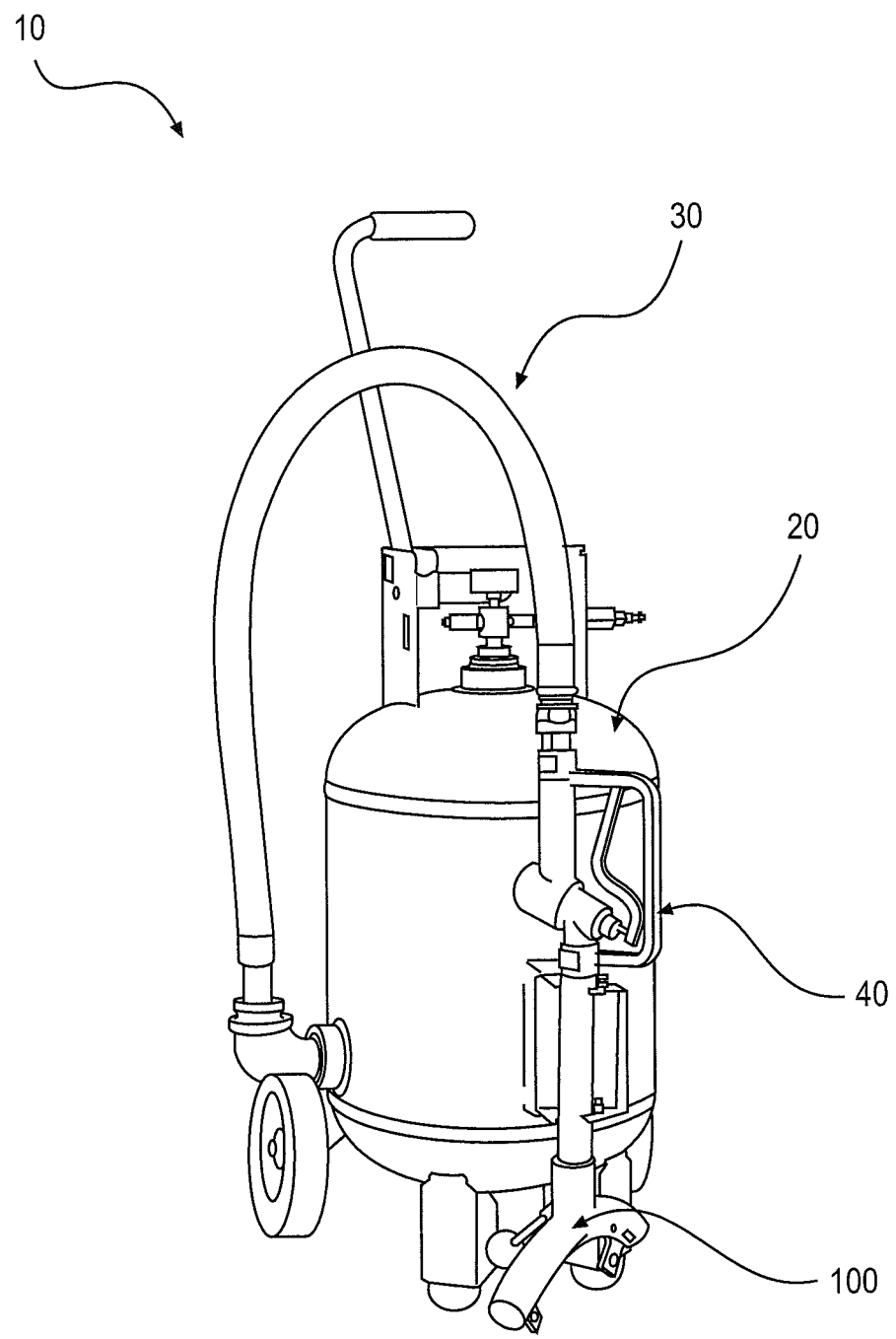
FIG. 1 is a perspective view of a bead seating system, in accordance with aspects of the present disclosure.

Embodiments in accordance with the invention will now be described with reference to the drawing figures, in which like reference numerals refer to like parts throughout.

Various aspects of methods and systems for seating a tire bead onto a bead area of a wheel or rim may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements present.

Relative terms such as "lower" or "bottom" and "upper" or "top" may be used herein to describe one element's relationship to another element illustrated in the drawings. It will be understood that relative terms are intended to encompass different orientations of an electric strike assembly in addition to the orientation depicted in the drawings. By way of example, if aspects of methods and systems for seating a tire bead onto a bead area of a wheel or rim shown in the drawings are turned over, elements described as being on the "bottom" side of the other elements would then be oriented on the "top" side of the other elements. The term "bottom" can therefore encompass both an orientation of "bottom" and "top" depending on the particular orientation of the apparatus.

FIG. 1 depicts a bead seating system 10 according to an exemplary embodiment. The system 10 may include a storage tank 20 for storing a compressed fluid, such as pressurized air. A fluid conduit 30, such as a rubber or plastic hose, for example, may provide fluid communication from the storage tank 20 to a valve assembly 40. The valve assembly 40 may, in turn, control a fluid flow to a bead seating tool 100. The bead seating tool 100 may be similar to the bead seating tool shown and described in U.S. patent application Ser. No. 13/081,129, incorporated herein by reference in its entirety. Other embodiments may use different types of bead seating tools 100.

Figure 2:
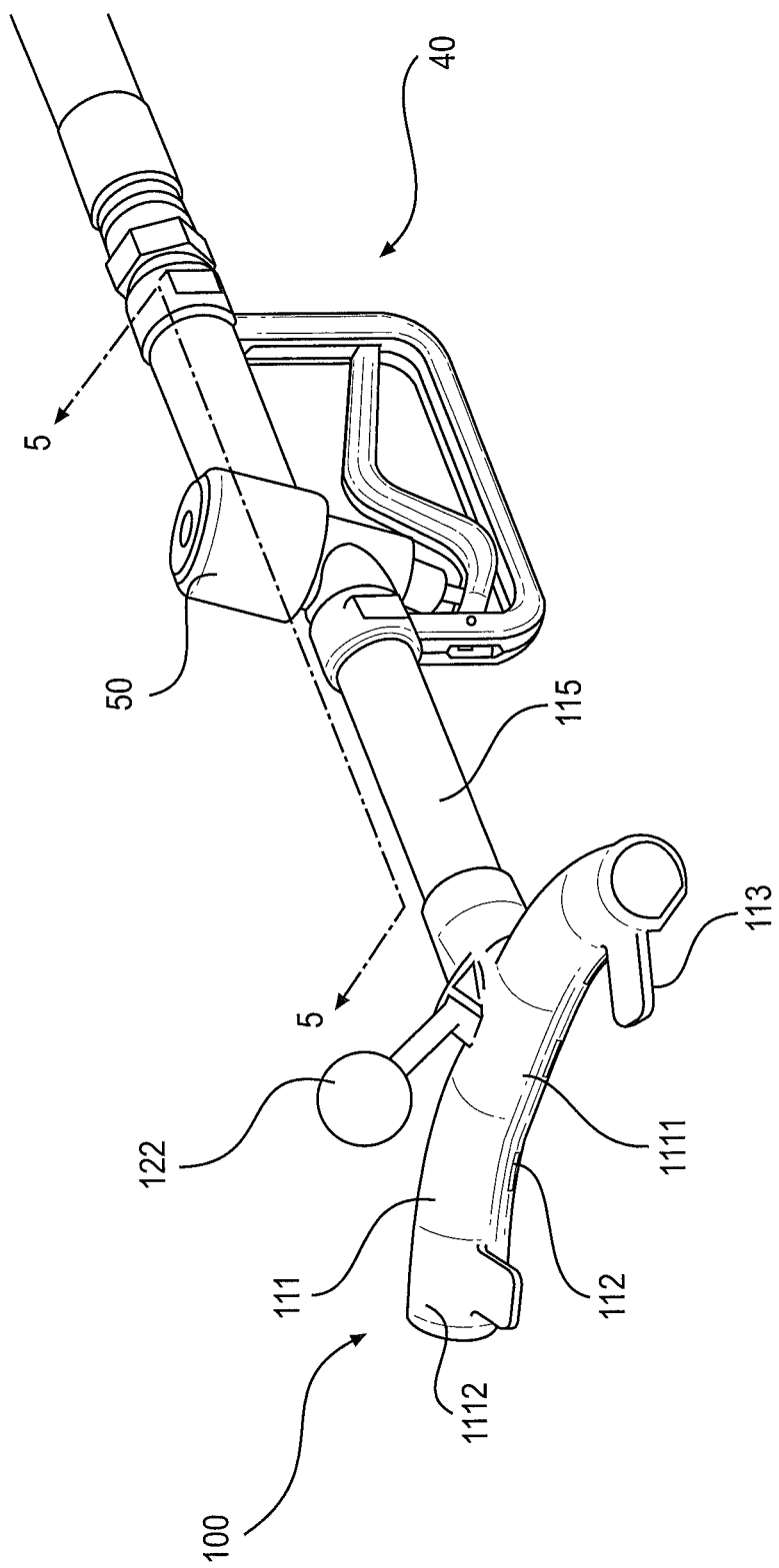
FIG. 2 illustrates components of a bead seating system, in accordance with aspects of the present disclosure.
Figure 3:
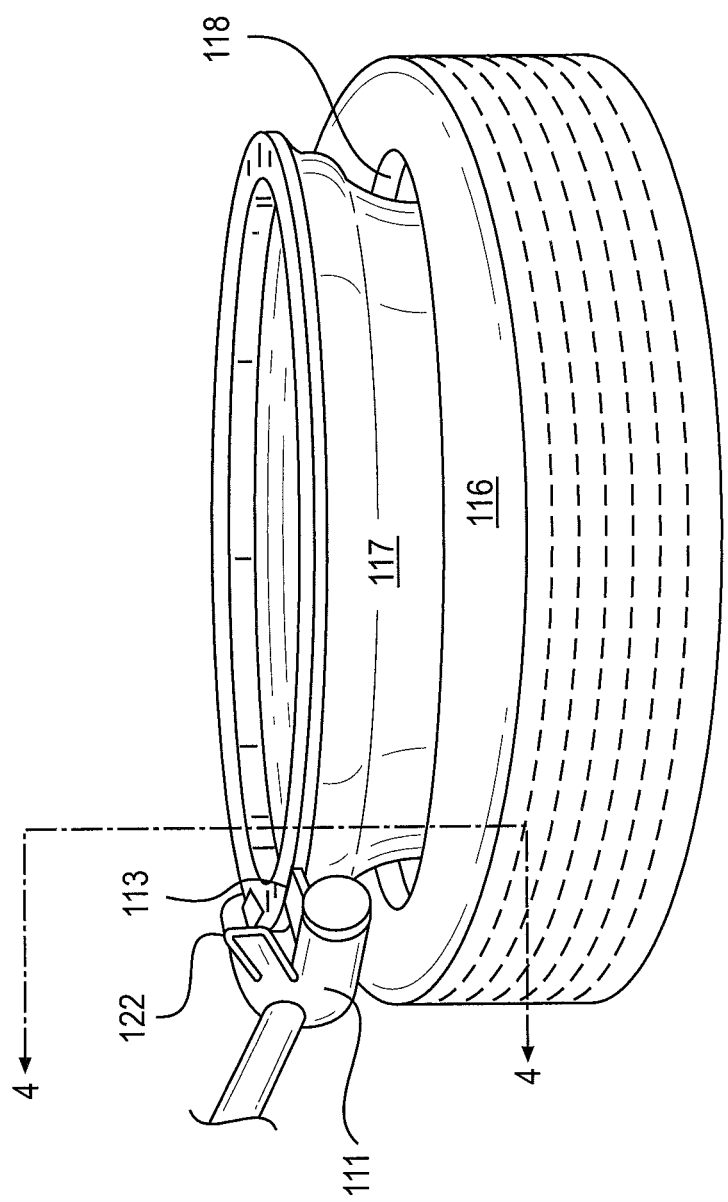
FIG. 3 illustrates aspects of a bead seating system as used for seating a tire on a rim, in accordance with aspects of the present disclosure.
Figure 4:
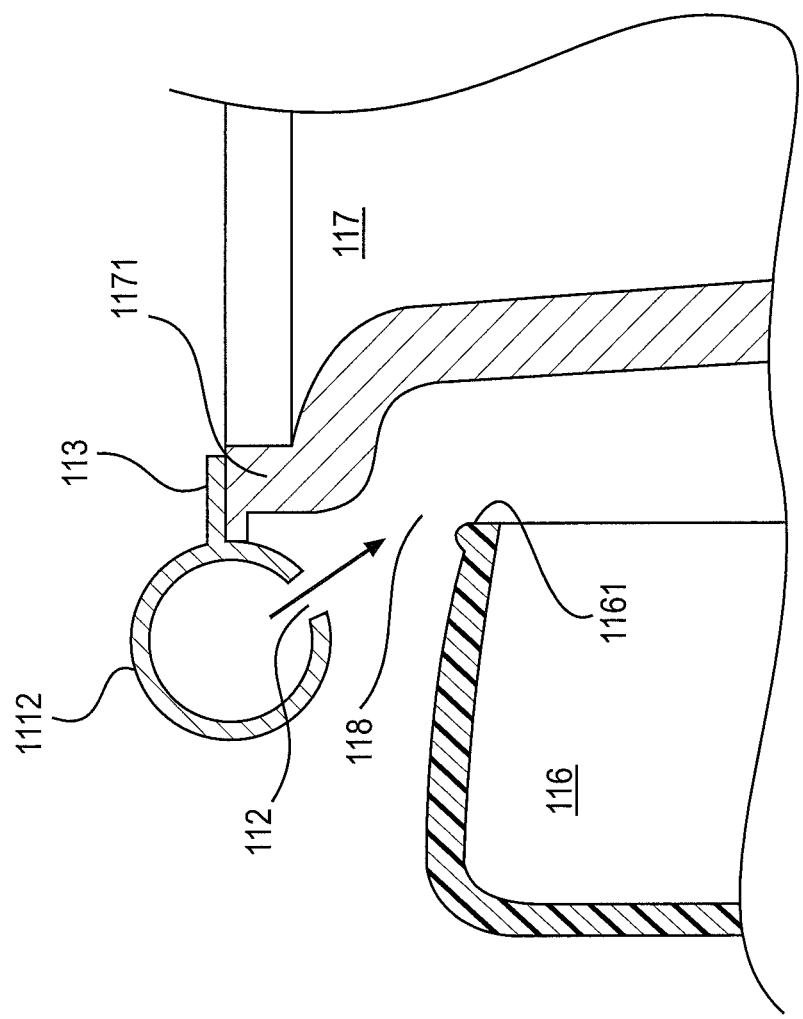
FIG. 4 illustrates a cutaway view of aspects of a bead seating system as used for seating a tire on a rim as seen along section line 4-4 in FIG. 3, in accordance with aspects of the present disclosure.

FIGS. 2-4 illustrate aspects of the bead seating system 10 and, in particular, how the system 10 may be used, for example, to seat a tubeless tire onto a rim. A body 111 of the bead seating tool 100 may be formed as a hollow bent pipe with a straight portion 1111 in the middle and bent portions 1112 at each end. This shape generally follows the curvature of a tire, but the total length of the bent pipe is such that the full length of the body 111 substantially fits in the gap between an unseated tire and rim.

FIGS. 3 and 4 show the body 111 positioned to seat a tire 116 on a rim 117. As shown, the protrusions 113 from the body 111 sit atop the rim 117. Holes 112 in the body 111 face the gap 118 between the tire 116 and the rim 117 may be positioned to vent a pulse of air into the gap 118 to seat the tire 116 on the rim 117, as shown by the arrow in FIG. 4.

FIG. 4 shows a cross sectional view of the tire 116 and rim 117 from FIG. 3, cut away at 4-4. As shown, the cross section is at a hole 112 of the body 111 below a protrusion 113 in one of the bent portions 1112 of the body 111. The protrusion 113 of the seating apparatus 111 may be arranged on the rim 117 so that the holes 112 vent a pulse of air into the gap 118 as illustrated by the arrow. When the pulse of air is released through the hole 112 into the gap 118, the bead 1161 of the tire 116 rises in response to inflation of the tire 116 to fit onto the bead-seating surface 1171 of the rim 117.

As the pulse of air is vented from the plurality of holes 112 in the body 111 into the gap 118 between the tire 116 and the rim 117, a recoil effect may be felt by a user holding the seating tool 100, similar to the recoil of a gun, for example. To prevent this recoil (also referred to as blow back) against the user of the seating tool 100, the protrusions 113 can be placed on and pressed against the rim via force applied to a handle device 122 provided as part of the seating tool 100. This application of pressure by the user toward the gap can counteract the blow back effect.

As shown in FIG. 2, a pipe 115 may channel air from the valve assembly 40 into the body 111 of the seating tool 100. The valve assembly 40 of the present disclosure may include a flow control valve 50 that differs from the conventional ball valves used in the prior art.

Figure 5:
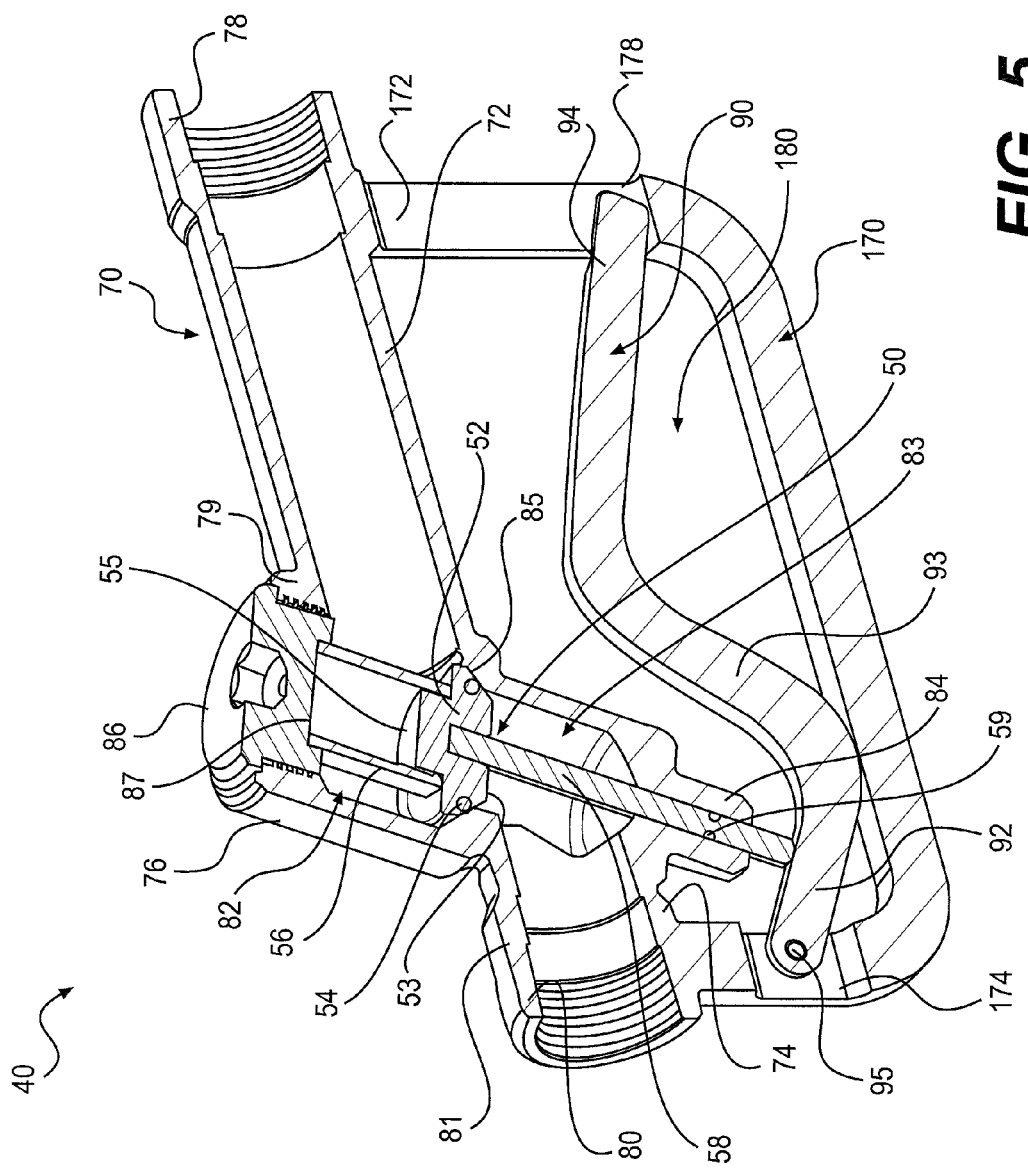
FIG. 5 illustrates a cutaway view of a valve assembly of a bead seating system as seen along section line 5-5 in FIG. 2, in accordance with aspects of the present disclosure.

As shown in FIG. 5, which is a cross-sectional view of the valve assembly 40 as cut away along line 5-5 in FIG. 2, the valve assembly 40 includes the flow control valve 50, a body structure 70, and an actuation control, such as a handle 90, for providing precise, tactile control over the airflow through the body structure 70.

The body structure 70 of the valve assembly 40 may be configured with a proximal inlet tube 72 and a distal outlet tube 74 separated by a valve cylinder portion 76. The proximal inlet tube 72 and the distal outlet tube 74 may be arranged substantially parallel with offset axes in the longitudinal direction. A first end 78 of the proximal inlet tube 72 may be open and formed with an expanded, internally threaded female portion for mating with an externally threaded male portion (not shown) of the fluid conduit 30. Other suitable structure for mating the valve assembly 40 to the fluid conduit 30 may also be used.

A second end 79 of the proximal inlet tube 72 may open into the valve cylinder portion 76. The distal outlet tube 74 may have an open outlet end 80 formed with an expanded, internally threaded female portion for mating with the seating tool 100 via the pipe 115. Other suitable structure for mating the distal outlet tube 74 to the seating tool 100 via the pipe 115 may also be used. The opposite end 81 of the distal outlet tube 74 may open into the valve cylinder portion 76 at a location on the diametric opposite side of the valve cylinder portion 76 from where the second end 79 of the proximal inlet tube 72 opens into the valve cylinder portion 76. The proximal inlet tube 72, distal outlet tube 74 and valve cylinder portion 76 define an airflow pathway for providing fluid communication from the fluid conduit 30 to the seating tool 100.

The valve cylinder portion 76 of the body 70 may include an upper valve chamber 82 having a first internal diameter and a lower valve chamber 83 having a second internal diameter smaller than the first internal diameter of the upper valve chamber 82. A step 85, which may be beveled as shown in FIG. 5, may thus be formed at the internal junction of the concentrically arranged upper valve chamber 82 and lower valve chamber 83. The step 85 forms a valve seat for the valve or flow plug 52.

The flow control valve 50 may include a valve plug 52 slidably arranged inside the upper valve chamber 82 so that a lower surface 53 of the valve plug 52 seats against the step 85. Accordingly, the lower surface 53 may be beveled or otherwise contoured to match the contours of the step 85 so as to form an air tight seal when the valve plug 52 is seated against the step 85. In accordance with another aspect of the present disclosure, an o-ring seal 54, may optionally be mounted on the lower surface 53 to be compressed between and seal the junction of the valve plug 52 and the step 85.

A force generator 56, which may be a compression spring, for example, or any suitable device for biasing the valve plug 52 against the step 85, may be mounted between a valve cap 86 and the valve plug 52. In accordance with aspects of the present disclosure, the valve cap 86 may be formed with a mounting receptacle 87, for example, for mounting and retention of one end of the force generator 56. In accordance with another aspect of the present disclosure, the valve plug 52 may be formed with a mounting protrusion 55, for example, for mounting and retention of the other end of the force generator 56. In accordance with yet another aspect of the present disclosure, the valve cap 86 may be threaded to be received by a threaded upper portion of the valve cylinder portion 76. The valve cap 86 may thus provide easy access to the various components of the flow control valve 50 for assembly, maintenance and repair.

An actuator shaft 58 may be mounted to the valve plug 52 to extend through the lower valve chamber 83, exiting the valve cylinder portion 76 through an extended lower wall portion 84. In accordance with aspects of the present disclosure, the actuator shaft 58 may be integrally formed with the valve plug 52. The actuator shaft 58 slidably extends through the lower wall portion 84 to abut a distal portion 92 portion of the handle 90, the lower wall portion 84 providing stability, support, and guidance to the actuator shaft 58. One or more o-ring seals 59, for example, may be provided to further enhance the air tight properties around the actuator shaft 58.

As shown in FIG. 5, the valve cylinder portion 76 may be formed at an angle to the substantially parallel longitudinal axes of the proximal inlet tube 72 and the distal outlet tube 74. The actuator shaft 58 may thus extend at an angle from the lower wall portion 84 to abut the distal portion 92 of the handle 90 at or near a hinged mounting point 95 of the handle 90. As shown in FIG. 5, the angle may be approximately 70°, however, any suitable angle between about 10° and 90° may be formed, with a more acute angle enabling a more direct-line air flow to be formed between the proximal inlet tube 72 and the distal outlet tube 74.

The handle 90 may be rotatably mounted to a frame extension 170 of the body structure 70. The frame extension 170 may resemble a D-bracket, for example, with a first end 172 of the frame extension 100 connected to the proximal inlet tube 72 near the first end 78 of the proximal inlet tube 72 and a second end 174 of the frame extension connected to the distal outlet tube 74 near the open outlet end 80 of the distal outlet tube 74. The frame extension 170 may be integrally formed with the body structure 70 and/or be formed as a separate member that is removably attached to the body structure 70. The handle 90 thus occupies a space 180 between the body structure 70 and the frame extension 170.

In accordance with aspects of the present disclosure, the handle 90 may be s-shaped, with the distal portion 92 of the handle extending proximally from the hinged mounting point 95 at an obtuse angle from the longitudinal axes of the proximal inlet tube 72 and the distal outlet tube 74. A middle portion 93 of the handle 90 may be formed to connect the distal portion 92 of the handle 90 to a rear grip portion 94 of the handle 90. The rear grip portion 94 may be substantially parallel to the distal portion 92 and extend towards the first end 172 of the frame extension 170. A recess 178 may be formed in the first end 172 of the frame extension 170 that captures and retains the rear grip portion 94 of the handle 90. The recess 178 may further define an extent of rotation of the handle 90.

Due to the force exerted by the force generator 56 against the valve plug 52, the actuator shaft 58 exerts equal pressure against the handle 90 at the point where the shaft 58 abuts the distal portion 92 of the handle 90. Thus, in a rest position, the handle may be maintained substantially in the position shown in FIG. 5 with the valve plug 52 seated against the step 85 such that fluid communication between the proximal inlet tube 72 and the distal outlet tube 74 is prevented. To use the bead seating tool 100, a user may grasp the handle 122 of the seating tool 100 with one hand and grasp the valve assembly 40 with the other hand. The valve assembly 40 may easily be grasped with one hand by holding the proximal inlet tube 72 between a thumb and index finger, grasping the tube 72 with the thumb while extending the fingers of the same hand to grasp the rear grip portion 94 of the handle 90. The user may thus situate the bead seating tool 100 as described above with respect to FIGS. 3 and 4 so that the air holes 112 are positioned to dispense a blast of air into the gap 118. Because the valve assembly 40 of the present disclosure permits easy, one-handed operation of the flow control valve 50, the user may much more easily maintain pressure on the bead seating tool 100 during air dispensing, preventing kick-back of the tool while being able to maintain proper positioning.

With the seating tool 100 situated against the rim 117, the user may squeeze the rear grip portion 94 of the handle 90 causing the handle 90 to rotate about the hinged mounting point 95. The mechanical advantage gained by the configuration of the handle 90 ensures that the user is able to easily and effectively open the valve plug 52. When the user squeezes the handle 90, rotation about the hinged mounting point 95 causes the actuator shaft 58 to slide through the lower wall portion 84 so that the valve plug 52 overcomes the biasing force of the force generator 56 and dislodges from the step or seat 85.

The pressurized fluid delivered to the valve assembly 40 from the storage tank 20 via the fluid conduit 30 immediately rushes through the gap created between dislodged valve plug 52 and the step 85. The pressurized fluid flows through the gap, into the lower valve chamber 83, and into the distal outlet tube 74 to be delivered to the seating tool 100 via the pipe 115.

The user may easily control the amount of air flow delivered to the seating tool 100 by the amount of rotation of the handle 90 as well as the amount of time before the handle 90 is released, allowing the biasing force of the force generator 56 to force the valve plug 52 back into position, preventing further delivery of pressurized fluid to the seating tool 100.

As noted above, the configuration of the handle 90 permits a strong tactile feel and a greater degree of control by the user over delivery of the pressurized fluid to the seating tool 100, wherein a greater arc of rotation by the rear grip portion 94 translates into a smaller axial movement of the actuator shaft 58. The user may thus easily control the amount of linear actuation of the actuator shaft 58 and thus the size of the gap between the valve plug 52 and the step 85. For example, the configuration of the handle 90 permits a user to quickly engage the handle 90 to full rotation, thus permitting a large burst of pressurized fluid through the seating tool 100. The user may thus seat the bead of the tire faster, as well as having the option of quickly shutting off delivery of pressurized fluid by simply letting go of the handle 90, saving pressurized fluid in the storage tank 20 for more procedures.

It is to be understood that any feature described in relation to any one aspect may be used alone, or in combination with other features described, and may also be used in combination with one or more features of any other of the disclosed aspects, or any combination of any other of the disclosed aspects.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A valve assembly comprising:
   a body structure including a proximal inlet tube and a distal outlet tube separated by a valve cylinder portion;
   a flow control valve situated in the valve cylinder portion, the flow control valve including a valve plug and an actuator shaft; and
   an actuation control pivotally mounted to the body structure, wherein rotational movement of the actuation control exerts an axial force against the actuator shaft to move the valve plug through the valve cylinder portion and open fluid communication between the proximal inlet tube and the distal outlet tube,
   wherein the flow control valve is positioned so that an angle formed between a central longitudinal axis of the flow control valve and a central longitudinal axis defined by the proximal inlet tube is less than 90 degrees; and wherein the distal outlet tube defines a second central axis, the central longitudinal axis and the second central axis being parallel and offset from each other in a longitudinal direction.

2. The valve assembly according to claim 1, further comprising:
   a container for storage of a pressurized fluid, the container configured to communicate with the proximal inlet tube.

3. The valve assembly according to claim 1, further comprising:
   a force generator; and
   a valve cap, wherein the force generator is mounted between the valve plug and the valve cap and exerts a closing force on the valve plug to prevent fluid communication between the proximal inlet tube and the distal outlet tube except when the axial force against the actuator shaft due to the rotational movement of the actuation control exceeds a predetermined threshold.

4. The valve assembly according to claim 3, wherein the valve cylinder portion has a threaded upper portion for receiving an externally threaded portion of the valve cap.

5. The valve assembly according to claim 1, wherein valve cylinder portion includes an upper valve chamber having a first internal diameter and a lower valve chamber having a second internal diameter smaller than the first internal diameter of the upper valve chamber, a step being formed at a junction of the concentrically arranged upper and lower valve chambers.

6. The valve assembly according to claim 5, wherein the valve plug is slidably arranged inside the upper valve chamber and the actuator shaft extends through the lower valve chamber to abut the actuation control.

7. The valve assembly according to claim 5, wherein the step is beveled and the valve plug has a beveled lower surface for creating an air tight seal when seated against the beveled step.

8. The valve assembly according to claim 1, wherein the proximal inlet tube has a first end and a second end, the first end formed with an expanded, internally threaded female portion and the second end opening into the valve cylinder portion.

9. The valve assembly according to claim 8, wherein the distal outlet tube has an open outlet end and an opposite end, the open outlet end formed with an expanded, internally threaded female portion and the opposite end opening into the valve cylinder portion.

10. The valve assembly according to claim 9, wherein the opposite end of the distal outlet tube opens into the valve cylinder at a diametrically opposed side of the valve cylinder portion from where the second end of the proximal inlet tube opens into the valve cylinder.

11. The valve assembly according to claim 1, wherein the valve cylinder portion is integrally formed at an angle to the substantially parallel and offset first and second axes so that the actuator shaft extends from the valve cylinder portion to abut the actuation control near where the actuation control is pivotally mounted to the body structure.

12. The valve assembly according to claim 11, wherein the body structure includes a frame extension resembling a D-bracket, the frame extension being connected near an open end of each of the proximal inlet tube distal outlet tube.

13. The valve assembly according to claim 12, wherein the frame extension has a first end connected near the open end of the proximal inlet tube and a second end connected near the open end of the distal outlet tube, and wherein the actuation control is an s-shaped handle having a distal portion, a middle portion, and a rear grip portion, the distal portion being pivotally mounted to the second end of the frame extension.

14. The valve assembly according to claim 13, wherein the rear grip portion of the handle is received in a recess formed in the first end of the frame extension.

* * * * *